US011197430B2

(12) United States Patent
Kong (10) Patent No.: US 11,197,430 B2
(45) Date of Patent: Dec. 14, 2021

(54) CONTAINER AND METHOD OF GROWING PLANTS

(71) Applicant: RIJK ZWAAN ZAADTEELT EN ZAADHANDEL B.V., De Lier (NL)

(72) Inventor: Kalin Kong, De Lier (NL)

(73) Assignee: RIJK ZWAAN ZAADTEELT EN ZAADHANDEL B.V., De Lier (NL)

( * ) Notice: Subject to any disclaimer, the term of this patent is extended or adjusted under 35 U.S.C. 154(b) by 134 days.

(21) Appl. No.: 16/377,660

(22) Filed: Apr. 8, 2019

(65) Prior Publication Data

US 2019/0327909 A1   Oct. 31, 2019

Related U.S. Application Data

(63) Continuation-in-part of application No. PCT/NL2017/005065, filed on Oct. 6, 2017.

(30) Foreign Application Priority Data

Oct. 10, 2016   (NL) ..................... 2917597

(51) Int. Cl.
*A01G 9/02* (2018.01)
*A01G 31/00* (2018.01)
(Continued)

(52) U.S. Cl.
CPC .............. *A01G 9/02* (2013.01); *A01G 3/00* (2013.01); *A01G 31/00* (2013.01); *A01G 2009/003* (2013.01)

(58) Field of Classification Search
CPC ...... B65D 85/52; B65D 85/505; B65D 85/50; B65D 85/34; B65D 65/02; B65D 85/345;
(Continued)

(56) References Cited

U.S. PATENT DOCUMENTS 2,717,444 A * 9/1955 Tomik ................. B65D 17/462
83/200.1
4,242,835 A * 1/1981 Mondragon Sorribes ..................
A01G 9/16
47/84
(Continued)

FOREIGN PATENT DOCUMENTS

EP           2719272 A1    4/2014
WO      2008116954 A1   10/2008
(Continued)

OTHER PUBLICATIONS

International Search Report and Written Opinion dated Jan. 25, 2018 in Int'l Application No. PCT/NL2017/050657.

*Primary Examiner* — Peter M Poon
*Assistant Examiner* — Jeffrey R Larsen
(74) *Attorney, Agent, or Firm* — Duane Morris LLP; Thomas J. Kowalski; Deborah L. Lu (57) ABSTRACT

The present invention relates to a container in which one or more plants can be held. The invention relates in particular to a container in which plants and/or seeds are able to grow. The invention also relates to a method for growing plants. According to the invention, the container comprises a container base having a growth medium in which one or more plants can be grown, a container lid that is coupled to the container base, and a cutting member for cutting through the one or more plants. According to the invention, the cutting member can be actuated prior to or during an action of at least substantially breaking the coupling between the container lid and the container base.

13 Claims, 4 Drawing Sheets

(51) Int. Cl.
*A01G 3/00* (2006.01)
*A01G 9/00* (2018.01)

(58) Field of Classification Search
CPC ........ A01G 9/088; A01G 9/0299; A01G 9/02;
B26D 1/547; B26D 1/46; B26B 27/002
USPC .......... 206/423; 47/84, 47.1, 66.7; 83/200.1,
83/83.788, 651.1
See application file for complete search history.

(56) References Cited

U.S. PATENT DOCUMENTS

| | | | |
|---|---|---|---|
| 4,979,332 A | | 12/1990 | Toshio |
| 5,375,372 A | | 12/1994 | Lee |
| 2003/0024163 A1 | | 2/2003 | Sasuga |
| 2012/0125172 A1 | * | 5/2012 | Hidalgo Garcia ...... A47J 19/00 83/676 |
| 2014/0101997 A1 | * | 4/2014 | Voermans .............. A01G 31/00 47/66.7 |
| 2017/0355493 A1 | * | 12/2017 | Newlands .............. B65D 41/52 |

FOREIGN PATENT DOCUMENTS

| | | | | |
|---|---|---|---|---|
| WO | WO-2015191687 A2 | * | 12/2015 | ........... A01G 9/0295 |
| WO | 2016042126 A1 | | 3/2016 | |

* cited by examiner

CONTAINER AND METHOD OF GROWING PLANTS

RELATED APPLICATIONS AND INCORPORATION BY REFERENCE

This application is a continuation-in-part application of international patent application Serial No. PCT/NL2017/050657 filed 6 Oct. 2017, which published as PCT Publication No. WO 2018/070865 on 19 Apr. 2018, which claims benefit of NL patent application Serial No. 2017597 filed 10 Oct. 2016.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to a container in which one or more plants can be held. The invention relates in particular to a container in which plants and/or seeds are able to grow. The invention also relates to a method for growing plants.

BACKGROUND OF THE INVENTION

Figure 1:
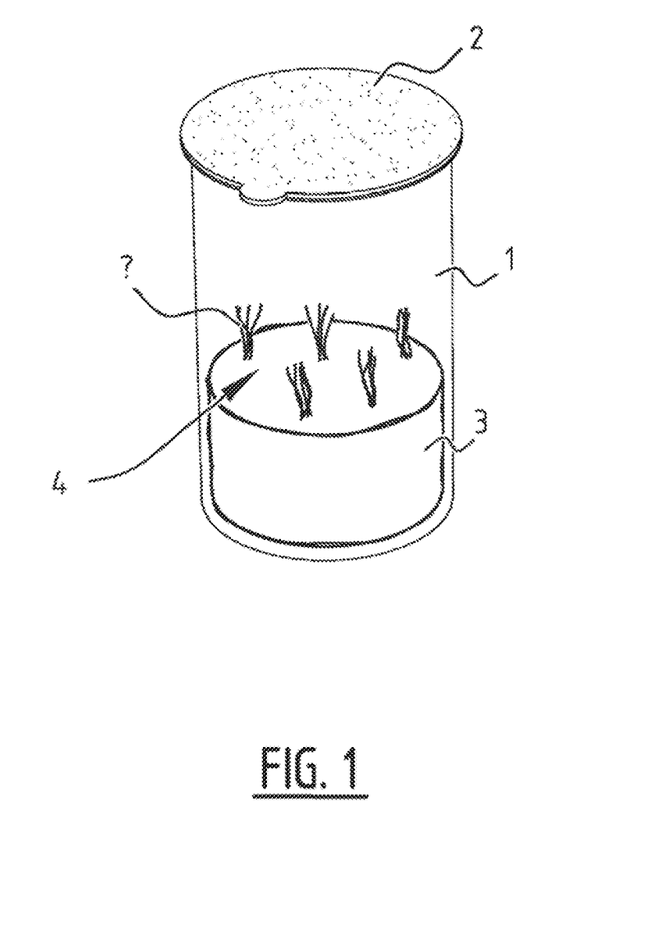
FIG. 1 illustrates a known holder for allowing plants to grow inside the holder.

EP 2719272 A1 discloses a container 1 for holding plants as illustrated in FIG. 1. Container 1 is closed by a semipermeable membrane 2 that allows the exchange of growth-related substances such as oxygen and carbon dioxide, but blocks unwanted substances such as pathogens. A growth medium 3 is located inside container 1 in which one or more plants 4 can grow.

The known container allows the growth of plants and/or seeds in a substantially pathogen-free environment. More in particular, plants can grow within the packaging the plant is sold in. For example, a supermarket can offer the container as illustrated in FIG. 1. A customer may then purchase the container having the plants arranged therein at a suitable moment of plant development. Typically, the plants inside the container have already sufficiently grown before the container is offered to customers. However, the invention does not exclude customers purchasing the container at an early stage of plant development and allowing the plant to further grow after purchase.

Although the aspect of plant growth in the final packaging is appealing for most customers, market acceptance is hindered due to the fact that the plant, which is held inside the container, such as lettuce, cannot be readily used when for instance preparing meals. Most costumers are familiar with a more convenient form of the plant. For example, pre-cut and pre-washed lettuce leafs can be purchased in a plastic bag. This allows the costumer to easily obtain and use the proper amount of leafs when preparing a meal.

Citation or identification of any document in this application is not an admission that such document is available as prior art to the present invention.

SUMMARY OF THE INVENTION

An object of the present invention is to provide an improvement to holders of the type described above in which this inconvenience is mitigated.

According to the invention, this object has been achieved using a container that may comprise a container base having a growth medium in which one or more plants can be grown, and a container lid that is coupled to the container base. The container further may comprise a cutting member for cutting through the one or more plants, wherein the cutting member can be actuated prior to or during an action of at least substantially breaking the coupling between the container lid and the container base. Accordingly, a user may cut through the one or more plants while the plants are still inside the container or as part of the action of opening the container for gaining access to the plants. In this manner, the situation can be avoided wherein a user must perform the cutting action after the plants have been removed from the container.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

According to the invention, this object has been achieved using a container that may comprise a container base having a growth medium in which one or more plants can be grown, and a container lid that is coupled to the container base. The container further may comprise a cutting member for cutting through the one or more plants, wherein the cutting member can be actuated prior to or during an action of at least substantially breaking the coupling between the container lid and the container base. Accordingly, a user may cut through the one or more plants while the plants are still inside the container or as part of the action of opening the container for gaining access to the plants. In this manner, the situation can be avoided wherein a user must perform the cutting action after the plants have been removed from the container.

An action of cutting through the one or more plants using the cutting member is preferably mechanically coupled to the action of at least substantially breaking the coupling between the container lid and the container base such that performing one of these actions automatically causes the other of said actions to be performed in a substantially simultaneous manner. In this manner, cutting through the one or more plants and breaking the coupling is part of a single operational step or action.

The action of at least substantially breaking the coupling between the container lid and the container base may comprise separating the container base and the container lid. Alternatively, the container lid and container base may remain coupled to each other, albeit in a limited region thereof such as a small part of an edge.

By performing the action of at least substantially breaking the coupling between the container lid and the container base the user gains access to the desired plant parts that are held inside the container. Typically, the desired plant parts, such as leafs, are attached to a remainder of the plant, for instance the stem and/or roots of the plant. According to the invention, the desired plant parts are separated or can be separated from the remainder of the plant at a time that the user wishes to obtain them from the container.

The cutting member may be configured for separating leafs from a remainder of the one or more plants. The dimensions of the cutting member and/or the material used for the cutting member can be optimized with respect to the nature of the desired plant parts to be separated. For instance, relatively thick leafs may be require a relatively strong and sharp cutting member when trying to separate the leafs from the stem of the plant.

The container of the type described above is particularly well suited for vegetables or herbs. In particularly, the container is suited for leafy vegetables such as lettuce, endive, rocket, lamb lettuce, corn salad, chard, leaf beet, spinach, radish. The vegetables can also be sprout vegetables, such as cress, beet sprouts, alfalfa, broccoli sprouts, bean sprouts, fennel sprouts, cabbage sprouts, garlic sprouts, leek sprouts, pea sprouts, chickpea sprouts, radish sprouts. The herbs are for example selected from chives, parsley, basil, dill, coriander, cilantro, mint, oregano, rosemary, thyme, marjoram, lemon balm, tarragon, sage.

The container according to the present invention reduces the time required for a user to obtain the plant or plant parts from the closed container. More in particular, no additional tools such as scissors or knives are required. For example, the user may perform the action of breaking the coupling between the container base and container lid as a result of which leafs of a lettuce plant are separated from the roots and/or remainder of the lettuce plant. In this case, the leafs can be directly used. Depending on the geometry of the container lid, the lid may be used as a bowl or secondary container for holding the cut plant parts.

The cutting member may comprise a cutting wire having a first end thereof fixedly connected to the container lid or the container base, wherein the cutting wire is arranged around the one or more plants. For example, a loop may be formed by the cutting wire around the one or more plants. The action of cutting through the one or more plants may comprise decreasing the size of the loop. This action may be coupled to the action of breaking the coupling between the container base and the container lid.

The cutting wire may comprise a second end that is configured to be grasped by the user for decreasing a size of the loop to thereby cut through the one or more plants. The second end may be fed through a supporting element, such as a hook or loop, that is fixedly attached to or formed in the container base or container lid. In this case, the loop is formed between the first end and the supporting element.

The supporting element may comprise an opening formed in the container base or container lid through which the second end of the cutting wire passes. Alternatively, the supporting element may comprise a loop element that is fixedly attached to the container base or container lid and through which the second end of the cutting wire passes.

The pulling action of the user may also initiate the action of breaking the coupling between the container base and the container lid. This may for instance be achieved if the cutting wire couples the container base and the container lid. In this case, the second end is preferably clear from the container base or container lid such that it can easily be grasped.

Alternatively, the container may comprise a sealing that couples the container base and the container lid, wherein the sealing is configured to break when a user pulls the second end. For example, the sealing may be fixedly attached to the cutting wire and arranged inside the loop formed by the cutting wire, wherein the cutting member is configured to cut through the sealing when pulling the second end thereof. Alternatively, the sealing can be fixedly attached to the cutting wire and arranged outside the loop formed by the cutting wire, wherein the cutting member is configured to tear the sealing open when pulling the second end thereof.

The container may additionally or alternatively comprise a grid of at least one cutting member, such as one or more cutting wires, which grid is arranged inside the container base or container lid, and wherein the one or more plants are allowed to grow or have grown through the grid. The grid may be configured to separate plant parts that have been cut, wherein the grid is sufficiently dense to prevent cut plant parts to pass therethrough. This can for instance be achieved if the grid is formed using a plurality of grid wires, wherein a distance between adjacent cutting wires in the grid is sufficiently small. The grid may be fixedly attached at its circumference to the container lid or to the container base.

The grid may be used in addition to the cutting wire that is arranged in a loop. Alternatively, the cutting wire arranged in a loop is omitted. For example, the cutting member may comprise the grid and the grid may be fixedly connected to the container lid, wherein the cutting member is arranged to cut said one or more plants when rotating the container lid relative to the container base.

To this end, the container lid and container base may comprise first and second coupling structures, respectively, wherein the coupling structures couple the container lid and container base, and wherein the coupling structures allow the container base and the container lid to be separated from each other by rotating one of the container lid and container base relative to the other. For example, the first and second coupling structures comprise co-acting screw-threads or wherein the first and second coupling structures are arranged to form a bayonet type closure.

The container lid and/or the container base may comprise at least one of the materials from the group consisting of a plastic, paper, metal, wood, compostable material, degradable material and bio-degradable material. Generally, the container base has a tray or cup shape, whereas the container lid typically has a shell shape.

The growth medium may comprise at least one of the ingredients from the group consisting of water, minerals (major salts as well as minor salts), sugars, trace elements, vitamins and amino acids.

The container base may comprise a water reservoir for holding water. This reservoir may be spaced apart from the growth medium or the water may be absorbed by the growth medium. In the formed case, the container may preferably further comprise transport means for transporting water from the reservoir to the growth medium. These transport means may be based on capillary action for transporting the water. An example of such means comprise a wick.

At least a part of the container lid and/or container base may be formed by a semi-permeable membrane or filter for blocking pathogens and for allowing passage of water vapour, carbon dioxide and oxygen.

The present invention further provides a method of growing plants, which may comprise providing the container as defined above having one or more plants, one or more seeds, and/or one or more seedlings at least partially arranged in or on the growth medium, allowing the one or more plants to mature and/or allowing the one or more seeds and/or the one or more seedlings to grow into one or more plants, and cutting through the one or more plants using the cutting member prior to or during an action of at least substantially breaking the coupling between the container lid and the container base.

The method may further comprise substantially simultaneously performing the actions of at least substantially breaking the coupling between the container base and container lid and said cutting through the one or more plants.

Figure 2A:
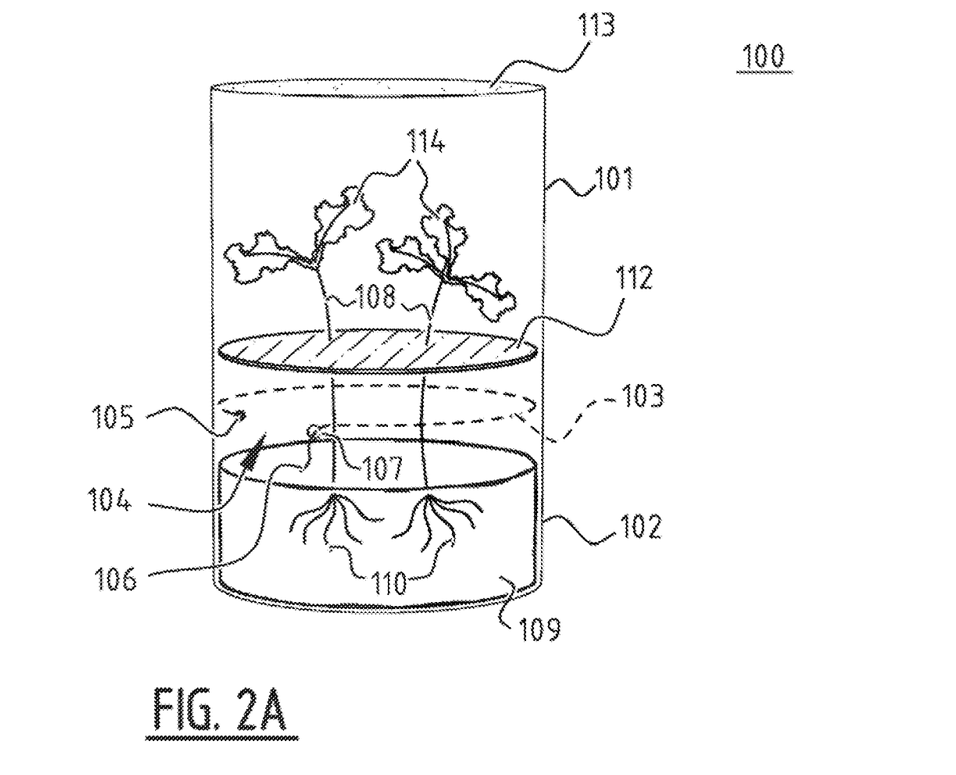
FIGS. 2A-2B illustrates an embodiment of the container of the present invention.

FIG. 2A illustrates an embodiment of a container 100 according to the present invention. Container 100 comprises a container lid 101 that is coupled to a container base 102 using a cutting wire 103. In addition, a small region 104 may exist in which container base 102 and container lid 101 are attached to each other. It should be noted that at least one of container base 102 and container lid 101 may be transparent.

Cutting wire 103 is on one end 105 fixedly connected to container base 102 on an inside thereof. Another end 106 of cutting wire 103 is fed, from the inside, through an opening 107 in container base 102, to the outside. In this manner, cutting wire 103 is arranged in a loop around plants 108. Moreover, free end 106 can be grasped by a user for initiating the cutting action.

A suitable growth medium 109, is arranged inside container base 102. This growth medium comprises the nutrients and substances required for seed germination and/or plant growth.

As shown in FIG. 2A, roots 110 of two plants 108 reside in growth medium 109. The stems 111 of plants 108 extend from growth medium 109 and pass through openings of a grid 112, which is fixedly attached to container lid 101 above cutting wire 103. Grid 112 is optional. Moreover, it can also be fixedly attached to container base 102.

Alternatively, container base 102 may be provided with a separate water reservoir, wherein the growth medium is held inside container base 102 at a distance from the water reservoir, in a manner similar to the holder depicted in FIG. 1. Water transport can be achieved by means of roots 110 extending into the water or by means of water transport means, such as a wick, configured for transporting water, preferably using capillary action, from the water reservoir to growth medium 109.

At the top, a semi-permeable barrier 113, in the form of a membrane, filter or film, may be provided for isolating the plants 108 from the surrounding of container 100. Barrier 113 is configured to allow the exchange of water vapour, oxygen and carbon dioxide, but to block the entry of pathogens from the outside to the inside of container 100. In this manner, plants 108 can be grown without or with a limited need for introducing herbicides or pesticides in container 100.

When a user grasps end 106, cutting wire 103 will be pulled inwardly thereby breaking the coupling between container base 102 and container lid 101. At the same time, the loop around plants 108 will be tightened and at a given moment in time, cutting wire 103 will engage and cut through stems 111 or other parts of plants 108. Here, it is noted that the edges of opening 107 have a supporting function when pulling on end 106. The same holds for the connection of end 105 of cutting wire 103 to the inside of container base 102. This connection should remain intact during at least most of the cutting action.

Figure 2B:
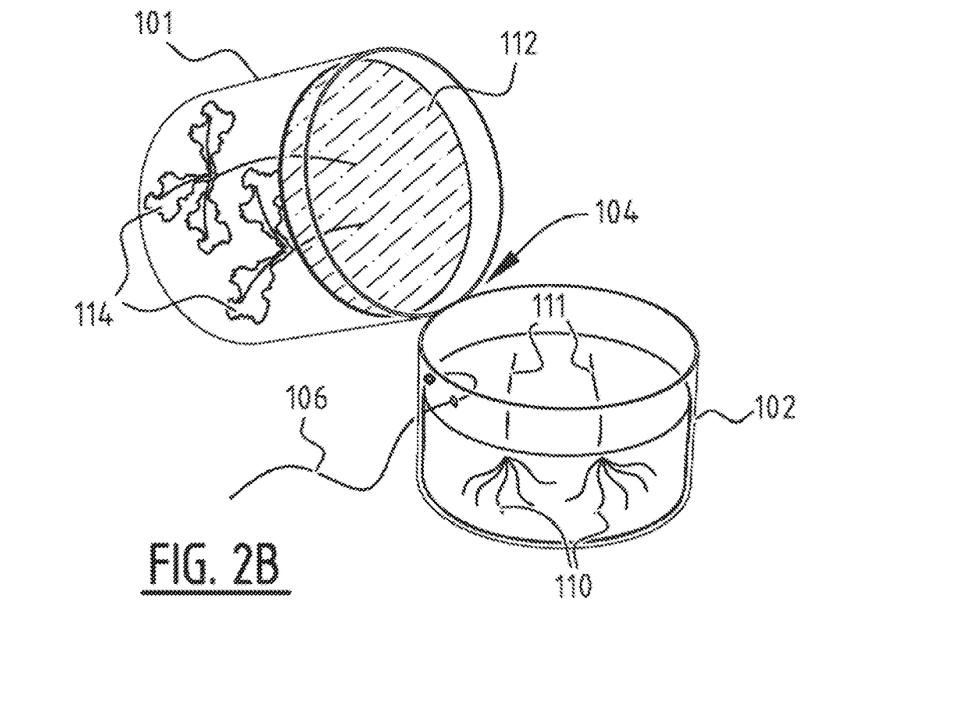

FIG. 2B illustrates a result of the user pulling cutting wire 103. As shown, container base 102 and container lid 101 are substantially decoupled. They only remain coupled near region 104. The skilled person readily understands that full decoupling can be arranged by appropriately choosing the dimensions of region 104 and/or the material properties at this position. For instance, this region can be made weak in such a manner that by sufficiently pulling cutting wire 103, container base 101 and container lid 102 get fully separated from each other. Alternatively, cutting wire 103 can be arranged differently, for instance by allowing the ends of cutting wires to pass each other.

Also shown are leafs 114 of plants 108, which are arranged inside container lid 101 in the space in between grid 112 and barrier 113.

Whether container 100 will be configured such that container lid 101 and container base 102 become fully separated after the cutting action depends on the preference of the user. Some users may prefer container base 102 and container lid 101 to remain coupled to keep a compact unit, whereas other users may prefer container lid 101 to get fully separated such that the user can continue by only handling and/or storing container lid 101 having the cut plant parts, such as leafs 114, arranged therein.

Cutting wire 103 is of a suitable material allowing it to cut through the plants. At the same time, cutting wire 103 should serve to couple container base 102 and container lid 101. As an exemplary packaging method, container base 102 may be first filled with a suitable growth medium 109 having the required substances, e.g. water and nutrients, added thereto. Thereafter, seeds may be deposited on or in growth medium 109 or seedlings or small plants are arranged in growth medium 109. At this stage, cutting wire 103 may already be arranged on an upper rim or edge of container base 102. As a next step, container lid 101 is attached to container base 102 via cutting wire 103. To this end, suitable techniques may be used such as gluing, clicking, screwing or sealing. When using grid 112 in combination with the abovementioned seedlings or small plants, it is preferred that the openings in grid 112 are such that the desired plant parts, such as leafs 114, are able to pass through these openings.

In FIG. 2A, cutting wire 103 couples container base 102 and container lid 101 as a result of which the action of breaking the coupling between base 102 and lid 101 and the action of cutting through plants 8 are mechanically coupled. Alternatively, cutting wire 103 is arranged on an inside of container base 102 or container lid 101 and separate coupling means are used for coupling base 102 and lid 101. In such embodiment, the action of breaking the coupling and the action of cutting through the plants are not mechanically coupled. It would however still be preferable if cutting wire 103, or another cutting member, can be engaged by a user for performing the cutting action from outside the container. As illustrated in FIG. 2A, this can be achieved by feeding one end of cutting wire 103 to the outside.

Figure 3A:
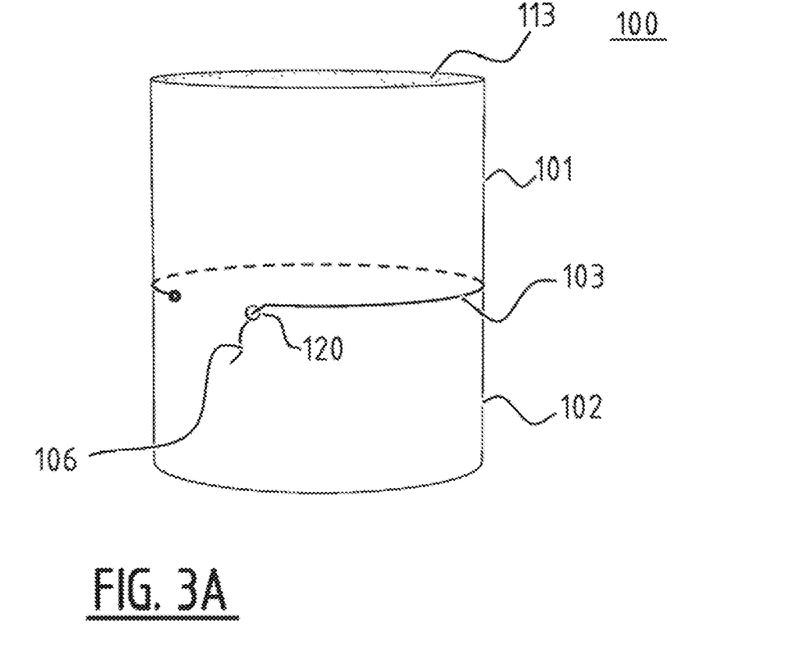
FIGS. 3A-3C illustrate different options for coupling the container base and container lid.
Figure 3B:
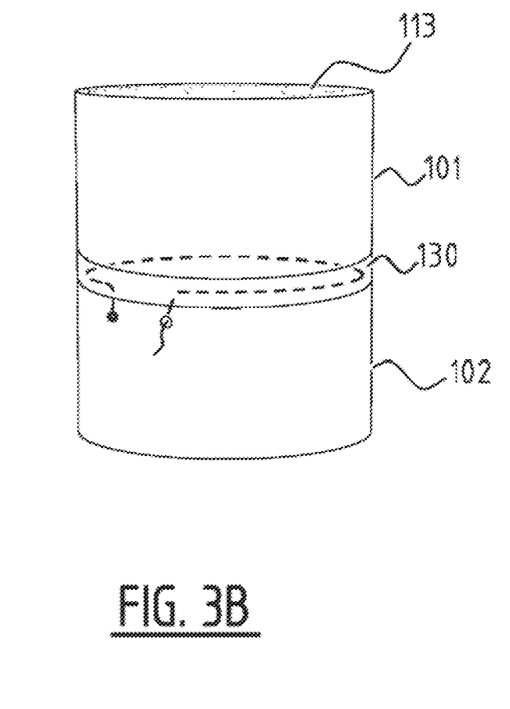
Figure 3C:
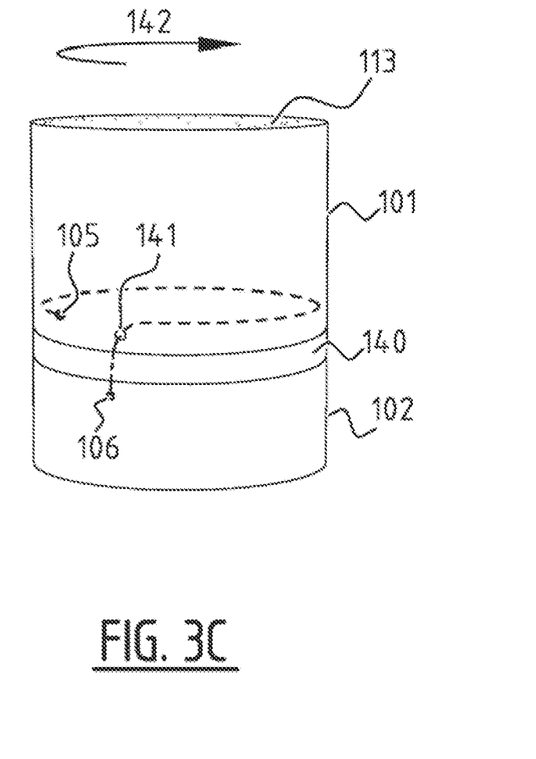

FIGS. 3A-3C show variations of the coupling between container base 102 and container lid 101. In these figures, the other elements of FIG. 2A, such as the plants, growth medium and grid, have been left out for clarity.

In FIG. 3A, cutting wire 103 is not arranged through an opening of container base 102, but is fed through a loop element 120 that is arranged on the outside of container base 102. When a user pulls end 106, the loop formed by cutting wire 103 will get smaller. Loop element 120 has a supporting function similar to the edges of opening 107 in FIG. 2A.

In FIG. 3B, a separate sealing element 130 is used for connecting container base 102 and container lid 101. Here, cutting wire 103 is fixedly attached to sealing element 130, whereby ends 104, 105 cutting wire 130 are connected to container base 102 in a manner identical to FIG. 2A.

Sealing element 130 can be made of a different material than cutting wire 103. The main purpose of sealing element 130 is to connect container base 102 and container lid 101. However, the strength of sealing element 130 should be such that sealing element 130 tears when pulling cutting wire 103, thereby breaking the coupling between container base 102 and container lid 101. Alternatively, cutting wire 103 can be arranged around sealing element 130 such that it cuts through sealing element 130 when a user pulls end 106.

FIG. 3C shows a container lid 101 and container base 102 that are coupled using complementary coupling means 140 in the form of screw threads. In this embodiment, container base 102 can container lid 101 can be coupled or decoupled by moving, e.g. rotating, them relative to each other. In this embodiment, cutting wire 103 has one end 105 thereof fixedly attached to container lid 101, whereas the other end 106 is fixedly attached to the container base 102. A loop element 141 may be used that is fixedly attached to container lid 101.

When a user rotates container lid 101 relative to container base 102 in the direction indicated by arrow 142, the distance between loop element 141 and the point of fixation of end 106 increases. As a result, the loop formed by cutting wire 103 will get smaller ultimately resulting in the cutting of the plants.

Figure 4A:
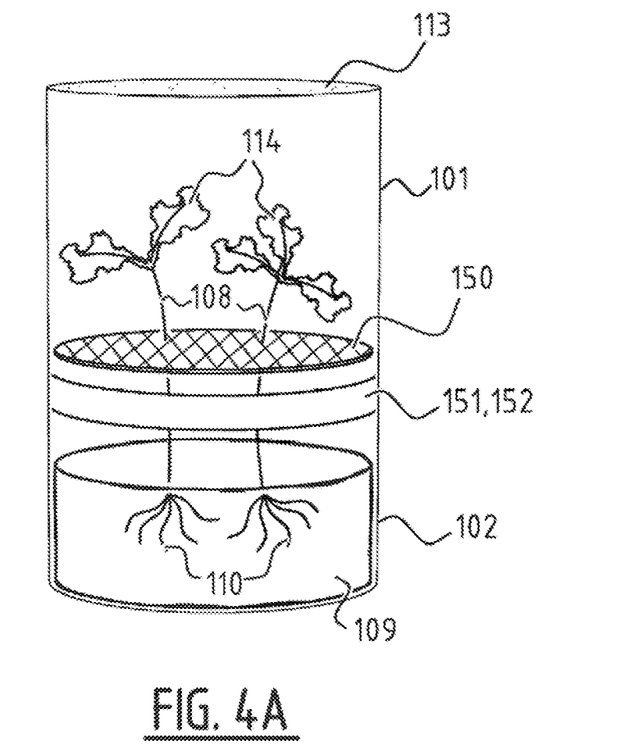
FIGS. 4A and 4B illustrate a further embodiment of the container of the present invention.
Figure 4B:
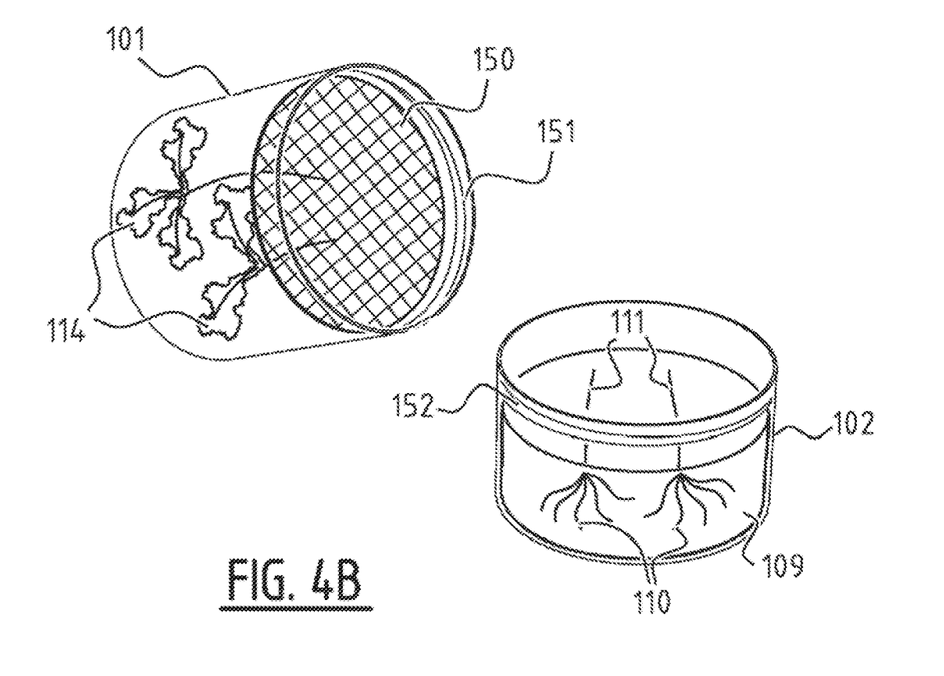

FIGS. 4A and 4B show an embodiment similar to the embodiment in FIG. 3C but wherein cutting wire 103 has been replaced by grid 150 of cutting wires that is fixedly attached to container lid 101. Cutting grid 150 serves to cut through plants 108 as will be elucidated later and will keep the cut plant parts separate from a remainder of the plants after cutting as indicated in FIG. 4B.

Similar to the FIG. 3C embodiment, container base 102 and container lid 101 are provided with complementary screw threads 151, 152.

When a user rotates container lid 101 relative to container base 102, cutting grid 150 will perform a rotary motion relative to plants 108. Consequently, cutting grid 150 will cut through plants 108 thereby separating the cut plant parts, such as leafs 114, in container lid 101 in the region in between cutting grid 150 and barrier 113. In a manner similar for all embodiments, a user may gain access to the cut plant parts by breaking barrier 113. In some embodiments, a grid is not used and the cut plant parts in container lid 101 are directly accessible. A particular advantage of the FIG. 4A embodiment is that the container can be easily assembled in case seeds are used as starting material. The seeds are simply placed on or in growth medium 109 inside container base 102 after which the container is closed by arranging container lid 101 on container base 102. In case the starting material comprises small plants or seedlings, it may be required to properly choose the distance between cutting grid 150 and growth medium 109 to avoid a cutting action when coupling container base 102 and container lid 101.

In the embodiments described above, cutting members and sealing elements were used for coupling the container lid and the container base. The skilled person will understand that the coupling between container lid and container base using these elements must be properly sealed to prevent pathogens from entering the container.

Although the present invention and its advantages have been described in detail, it should be understood that various changes, substitutions and alterations can be made herein without departing from the spirit and scope of the invention as defined in the appended claims.

The invention is further described by the following numbered paragraphs:

1. A container, comprising:
  a container base, the container base comprising a growth medium in which one or more plants can be grown;
  a container lid that is coupled to the container base;
  a cutting member for cutting through the one or more plants, wherein the cutting member can be actuated prior to or during an action of at least substantially breaking the coupling between the container lid and the container base;
  wherein an action of cutting through the one or more plants using the cutting member is mechanically coupled to the action of at least substantially breaking the coupling between the container lid and the container base such that performing one of these actions automatically causes the other of said actions to be performed in a substantially simultaneous manner.

2. The container of paragraph 1, wherein the container lid and container base comprise first and second coupling structures, respectively, wherein the coupling structures couple the container lid and container base, and wherein the coupling structures allow the container base and the container lid to be separated from each other by rotating one of the container lid and container base relative to the other.

3. The container of paragraph 2, wherein the first and second coupling structures comprise co-acting screw-threads or wherein the first and second coupling structures are arranged to form a bayonet type closure.

4. The container of any of the previous paragraphs, wherein said action of at least substantially breaking the coupling between the container lid and the container base comprises separating the container base and the container lid.

5. The container of any of the previous paragraphs, wherein the cutting member is configured for separating leafs from a remainder of the one or more plants.

6. The container of any of the previous paragraphs, wherein the cutting member has a first end thereof fixedly connected to the container lid or the container base, said cutting member being arranged in a loop substantially surrounding said one or more plants, and said cutting member preferably comprising a cutting wire.

7. The container of paragraph 6, wherein the cutting member comprises a second end that is configured to be grasped by the user for decreasing a size of the loop to thereby cut through said one or more plants.

8. The container of paragraph 7, wherein the second end is fed through a supporting element that is fixedly attached to of formed in the container base or container lid, wherein the loop is formed between the first end and the supporting element.

9. The container of paragraph 8, wherein the supporting element comprises an opening formed in the container base or container lid through which the second end of the cutting member passes, or wherein the supporting element comprises a loop element that is fixedly attached to the container base or container lid and through which the second end of the cutting member passes.

10. The container of any of the paragraphs 7-9, wherein the cutting member couples the container base and the container lid.

11. The container of paragraph 10, wherein the second end is clear from the container base and the container lid such that a user can grasp the second end.

12. The container of any of the paragraphs 7-9, wherein the container comprises a sealing that couples the container base and the container lid, wherein the sealing is configured to break when the user pulls the second end.

13. The container of paragraph 12, wherein the sealing is fixedly attached to the cutting member and arranged inside the loop formed by the cutting member, said cutting member being configured to cut through the sealing when pulling the second end thereof.

14. The container of paragraph 12, wherein the sealing is fixedly attached to the cutting member and arranged outside the loop formed by the cutting member, said cutting member being configured to tear the sealing open when pulling the second end thereof.

15. The container of any of the previous paragraphs, further comprising a grid of at least one cutting member, such as one or more cutting wires, or a disc provided with openings, wherein the grid or disc is arranged inside the container base or container lid, wherein the one or more plants are allowed to grow or have grown through the grid or through the openings in the disc.

16. The container of paragraph 15, wherein the grid or disc is configured to separate plant parts that have been cut, wherein the grid is sufficiently dense or the openings sufficiently small to prevent cut plant parts to pass therethrough.

17. The container assembly of paragraph 15 or 16, wherein the grid or disc is fixedly attached at its circumference to the container lid or to the container base.

18. The container assembly of paragraph 17, wherein the cutting member comprises said grid or disc and wherein the grid or disc is fixedly connected to the container lid, wherein the cutting member is arranged to cut said one or more plants when rotating the container lid relative to the container base.

19. The container of paragraph 18, wherein the container lid and container base comprise first and second coupling structures, respectively, wherein the coupling structures couple the container lid and container base, and wherein the coupling structures allow the container base and the container lid to be separated from each other by rotating one of the container lid and container base relative to the other.

20. The container of paragraph 19, wherein the first and second coupling structures comprise co-acting screw-threads or wherein the first and second coupling structures are arranged to form a bayonet type closure.

21. The container of any of the previous paragraphs, wherein the container lid and/or the container base comprises at least one of the materials from the group consisting of a plastic, paper, metal, wood, compostable material, degradable material and bio-degradable material.

22. The container of any of the previous paragraphs, wherein the growth medium comprises at least one of the ingredients from the group consisting of water, minerals (major salts as well as minor salts), sugars, trace elements, vitamins and amino acids.

23. The container of any of the previous paragraphs, wherein the container base comprises a water reservoir for holding water or wherein water is absorbed in the growth medium.

24. The container of paragraph 23, wherein the reservoir is spaced apart from the growth medium, the container preferably further comprising transport means for transporting water from the reservoir to the growth medium.

25. The container of any of the previous paragraphs, wherein at least a part of the container lid and/or container base is formed by a semi-permeable filter or membrane for blocking pathogens and for allowing passage of water vapor, carbon dioxide and oxygen.

26. The container of any of the previous paragraphs, comprising the one or more plants arranged at least partially inside the growth medium.

27. A container, comprising:
a container base, the container base comprising a growth medium in which one or more plants can be grown;
a container lid that is coupled to the container base;
a cutting member for cutting through the one or more plants, wherein the cutting member can be actuated prior to or during an action of at least substantially breaking the coupling between the container lid and the container base;
wherein the cutting member has a first end thereof fixedly connected to the container lid or the container base, said cutting member being arranged in a loop substantially surrounding said one or more plants, and said cutting member preferably comprising a cutting wire.

28. A container, comprising:
a container base, the container base comprising a growth medium in which one or more plants can be grown;
a container lid that is coupled to the container base;
a grid of at least one cutting member or a disc with openings, each cutting member or the disc being arranged for cutting through the one or more plants, wherein the grid or disc can be actuated prior to or during an action of at least substantially breaking the coupling between the container lid and the container base, which grid or disc is arranged inside the container base or container lid, wherein the one or more plants are allowed to grow or have grown through the grid or through the openings in the disc.

29. A method of growing plants, comprising:

providing the container as defined in any of the previous paragraphs having one or more plants, one or more seeds, and/or one or more seedlings at least partially arranged in or on the growth medium;

allowing the one or more plants to mature and/or allowing the one or more seeds and/or the one or more seedlings to grow into one or more plants;

cutting through the one or more plants using the cutting member prior to or during an action of at least substantially breaking the coupling between the container lid and the container base;

wherein the actions of at least substantially breaking the coupling between the container base and container lid and said cutting through the one or more plants are performed substantially simultaneously;

wherein an action of cutting through the one or more plants using the cutting member is mechanically coupled to the action of at least substantially breaking the coupling between the container lid and the container base such that performing one of these actions automatically causes the other of said actions to be performed in a substantially simultaneous manner.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A container, comprising:
   a container base comprising a growth medium in which one or more plants can be grown;
   a container lid coupled to the container base;
   a cutting member for cutting through the one or more plants,
   wherein the cutting member has a first end thereof fixedly connected to the container lid or the container base,
   wherein said cutting member is arranged in a loop substantially surrounding said one or more plants,
   wherein the cutting member comprises a second end that is configured to be grasped by a user for decreasing a size of the loop to cut through said one or more plants;
   wherein the container comprises a sealing that couples the container base and the container lid,
   wherein said sealing is fixedly attached to the cutting member and arranged either:
   inside the loop formed by the cutting member, wherein the cutting member is configured to cut through the sealing when pulling the second end thereof; or
   outside the loop formed by the cutting member, wherein the cutting member is configured to tear the sealing open when pulling the second end thereof.

2. The container of claim 1, wherein the cutting member is configured for separating leaves from a remainder of the one or more plants.

3. The container of claim 1, wherein said cutting member comprises a cutting wire.

4. The container of claim 1,
   wherein the second end is fed through a supporting element that is fixedly attached to or formed in the container base or container lid and the loop is formed between the first end and the supporting element,
   wherein said supporting element comprises an opening formed in the container base or container lid through which the second end of the cutting member passes, or
   wherein a loop element that is fixedly attached to the container base or container lid and through which the second end of the cutting member passes.

5. The container of claim 1,
   wherein the container lid and/or the container base comprises at least one of the materials from the group consisting of a plastic, paper, metal, wood, compostable material, degradable material and bio-degradable material,
   wherein the growth medium comprises at least one of the ingredients from the group consisting of water, minerals, sugars, trace elements, vitamins and amino acids,
   wherein the container base comprises a water reservoir for holding water or wherein water is absorbed in the growth medium,
   wherein the reservoir is spaced apart from the growth medium,
   wherein the container further comprising transport means for transporting water from the reservoir to the growth medium, and
   wherein at least a part of the container lid and/or container base is formed by a semi-permeable filter or membrane for blocking pathogens and for allowing passage of water vapor, carbon dioxide and oxygen.

6. The container of claim 1, comprising the one or more plants arranged at least partially inside the growth medium.

7. A container, comprising:
   a container base comprising a growth medium in which one or more plants can be grown, and
   a container lid;
   wherein the container lid and container base comprise first and second coupling structures, respectively,
   wherein the first and second coupling structures are configured to couple the container lid and container base,
   wherein the first and second coupling structures are configured to allow the container base and the container lid to be separated from each other by rotating one of the container lid and container base relative to the other,
   wherein the container further comprises a grid of cutting wires arranged inside the container base or container lid,
   wherein each cutting wire is arranged for cutting through the one or more plants upon mutually rotating the container lid and container base, and
   wherein the one or more plants are allowed to grow or have grown through the grid.

8. The container of claim 7, wherein the grid is configured to separate plant parts that have been cut, wherein the grid is sufficiently dense or the openings sufficiently small to prevent cut plant parts to pass therethrough.

9. The container of claim 7, wherein the grid is fixedly attached at its circumference to the container lid or to the container base.

10. The container of claim 7,
    wherein the first and second coupling structures comprise co-acting screw-threads or
    wherein the first and second coupling structures are arranged to form a bayonet type closure.

11. A container, comprising:
a container base comprising a growth medium in which one or more plants can be grown;
a container lid;
a cutting member for cutting through the one or more plants,
wherein the container lid and container base comprise first and second coupling structures, respectively,
wherein the first and second coupling structures are configured to couple the container lid and container base,
wherein the first and second coupling structures are configured to allow the container base and the container lid to be separated from each other by rotating one of the container lid and container base relative to the other,
wherein the cutting member has a first end thereof fixedly connected to one of the container lid and container base and a second end thereof fixedly connected to the other of the container lid and container base,
said cutting member is arranged in a loop substantially surrounding said one or more plants, and
wherein the cutting member is configured to, upon mutual rotation of the container base and container lid, reduce the loop thereby cutting through the one or more plants.

12. The container of claim 11,
wherein the first and second coupling structures comprise co-acting screw-threads or
wherein the first and second coupling structures are arranged to form a bayonet type closure.

13. The container of claim 5, wherein the minerals comprise-major salts or minor salts.

* * * * *

UNITED STATES PATENT AND TRADEMARK OFFICE
CERTIFICATE OF CORRECTION

PATENT NO. : 11,197,430 B2
APPLICATION NO. : 16/377660
DATED : December 14, 2021
INVENTOR(S) : Kalin Kong Page 1 of 1

It is certified that error appears in the above-identified patent and that said Letters Patent is hereby corrected as shown below:

On the Title Page

Item (63), should read as follows:
(63) Continuation-in-part of application No. PCT/NL2017/050657 filed on October 6, 2017

Item (30), should read as follows:
(30) Foreign Application Priority Data
October 10, 2016 (NL) 2017597

In the Claims

Claim 13 should read as follows:
13. The container of claim 5, wherein the minerals comprise major salts or minor salts.

Signed and Sealed this
Twenty-eighth Day of June, 2022

Katherine Kelly Vidal
*Director of the United States Patent and Trademark Office*